United States Patent Office
3,332,886
Patented July 25, 1967

3,332,886
PROCESS FOR THE PREPARATION OF TRANSITION METAL - FLUORO - ALUMINO - SILICATE CATALYSTS
William B. Wilson, Pleasant Hill, Calif., assignor to Shell Oil Company, New York, N.Y., a corporation of Delaware
No Drawing. Filed Oct. 21, 1963, Ser. No. 317,794
10 Claims. (Cl. 252—442)

This invention relates to the preparation of catalyst compositions useful for carrying out hydrocarbon conversion. More particularly, the invention relates to the preparation of catalysts which are useful for carrying out destructive hydrogenation of hydrocarbons.

Destructive hydrogenation by catalytic means, more commonly called hydrocracking, is old and well known to the art. Destructive hydrogenation of the hydrocarbon oil, usually a coal tar or a high-boiling petroleum fraction, such as gas oils or topped crude, generally is carried out at quite high temperatures and pressures of the order of 850° F. and 1500 p.s.i.g. and upward. Catalysts for the destructive hydrogenation of oils are generally a combination of hydrogenation and cracking components.

The cracking component is generally an acid-acting refractory oxide such as the siliceous cracking catalysts comprising silica in combination with alumina, magnesia, titania, zirconia and the like. The silica content is usually in the range from about 60% to 90% by weight. A particularly effective cracking component is the silica-alumina cracking catalysts comprising 60–90% silica and 40–10% alumina.

The hydrogenation component generally consists of one or more transitional metals having atomic numbers less than 79. By transition metal is meant those metals which are distinguished from the metals immediately preceding them in the Periodic Table by the addition of an electron to an inner orbit, i.e., other than the outside orbit. Thus, those metals are included which have atomic numbers of 21 through 30, 39 through 46 and 57 through 78. A particularly active class is composed of the Group VIII metals, especially the iron group metals. Of these, nickel is particularly preferred as a hydrocracking catalyst component.

While the transitional metal hydrogenation component(s) can be incorporated into the catalyst by impregnation of a decomposable salt of the metal onto the cracking component, it has recently been proposed to incorporate the metal hydrogenation component into a hydrogel of the refractory oxide cracking component. Highly active and improved catalysts of this type comprise a metal hydrogenation component, in particular an iron group metal, fluoride, silica and alumina. The iron group metal apparently is bound with the other components of the catalyst in such a manner that it is highly active and stable for hydrocracking high boiling hydrocarbon oils and yet is less susceptible to poisons, such as nitrogen compounds, which are generally present in such oils. Although the exact chemical and physical nature of such catalysts is not known with certainty, they are generally characterized as a metal-fluoro-alumino-silicate.

The improved catalysts are prepared, for example, by contacting a silica-alumina hydrogel before it is dried with an aqueous solution of a transition metal compound. The metal compound can be any suitable water-soluble compound preferably wherein the metal is present as a cation. The metal cation exchanges with cations in the hydrogel, for example, ammonium ions in the case of a hydrogel which has been washed with an ammonium salt to remove sodium ions.

Several methods have been used to prepare such silica-alumina catalysts. In one such procedure an aqueous solution of sodium aluminate is added rapidly to a solution of sodium silicate in the proper proportions to provide the desired concentration of silica and alumina in the catalyst. The pH of the mixture is brought to about 7 by the addition of a strong mineral acid, such as sulfuric acid, and the hydrogel is allowed to age approximately five minutes. The hydrogel is then washed with ammonium nitrate solution and water to eliminate, insofar as possible, sodium ions from the gel. To incorporate fluoride in the silica-alumina hydrogel, a fluoride compound, e.g., sodium fluoride, can be added in the desired proportion, such as to the sodium aluminate solution.

An alternative method of preparing silica-alumina hydrogel is to add a mineral acid, such as sulfuric or hydrochloric acid, to an aqueous solution of sodium silicate which forms a silica gel the pH of which is 8–9. Aluminum is incorporated by the addition of aluminum sulfate which lowers the pH to about 3. This is followed by neutralization with a base such as ammonium or sodium hydroxide. The hydrogel is then washed with ammonium nitrate solution and water to remove sodium ions.

The metal component is incorporated into the catalyst by contacting the wet hydrogel with an aqueous solution of transition metal compound. Usually and preferably the metal compound is a salt in which the metal is present as a cation, such as a sulfate, nitrate or chloride of the metal in question. However, in some cases salts in which the metal is present as an anion may be used. Examples of metals which are typically incorporated from the anionic form are molybdenum, tungsten, vanadium, rhenium and platinum. In the case in which more than one metal component is to be incorporated into the catalyst, it is preferred that at least one of the metals be incorporated by cation exchange. It is not necessary, however, that they be incorporated simultaneously. Preferably, the hydrogel is reslurried in the transition metal solution as this gives highly efficient contacting. Passing the solution through a filter cake of the hydrogel, such as that obtained on a rotary drum filter or in a filter press, is sometimes inefficient owing to channeling of the solution through the filter cake. The ion-exchanged hydrogel is washed with water, dried and calcined, preferably in air, at a temperature of from about 800° to 1200° F.

To incorporate fluorine into the catalyst, hydrofluoric acid or water-soluble fluoride compound such as ammonium fluoride, sodium fluoride, and the like, can be used. The fluoride is preferably incorporated into the silica-alumina hydrogel, such as, for example, by adding sodium fluoride to the sodium aluminate solution which is added to sodium silicate solution.

The ion-exchanged catalyst apparently is an amorphous metal alumino silicate structure, or an amorphous metal fluoro alumino silicate, as indicated by various analytical techniques. For example, an ion-exchanged nickel-fluoro-silica-alumina catalyst calcined at 930–1020° F. was determined to be paramagnetic, indicating the nickel to be present in an ionic form. Yet X-ray and electron diffraction examination revealed the catalyst to be amorphous with no evidence of nickel oxide crystals. Further, the ion-exchanged catalyst is resistant to sulfiding on exposure to a sulfur environment. For example, an ion-exchanged nickel catalyst exposed to a hydrogen sulfide containing gas ($10H_2/1H_2S$) and used to hydrocrack 30 volumes of hydrocarbon (per volume of catalyst) containing 43 p.p.m. S was determined by X-ray examination to contain little if any nickel sulfide structure. This indicates that there is little or no nickel oxide which at least under these particular conditions, is converted to crystals of nickel sulfide. With an impregnated nickel catalyst, prepared by impregnating silica-alumina (13% alumina) with nickel nitrate and calcining at 932° F., X-ray diffraction examination indicates the catalyst to contain large crystallites (approx. 400 A.) of nickel oxide. Upon exposure to a sulfur environment, the impregnated catalyst is sulfided readily since nickel oxide is substantially converted to nickel sulfide.

Incorporation of the metal ion into the hydrogel by ion exchange results in a calcined product in which the metal ions are more thoroughly reacted to form a metal alumino silicate structure than is achieved by co-gelling the metal compound with the silica-alumina. It is possible that during the co-gelling, the metal ions, such as nickel ions, are in competition with sodium ions, from the sodium silicate or sodium aluminate, in entering the silica-alumina structure. In this event, only a portion of the nickel ion may be actually reacted, the unreacted portion remaining within the gel, presumably as highly dispersed NiO, and an imperfect structure may be obtained when the sodium is eventually washed free. On the other hand, in the ion-exchange method, the silica-alumina structure is formed with sodium ions which are washed out by ammonium ions which then are eventually replaced by nickel ions. Thus, a more highly reacted species is formed in which nickel ions are all chemically reacted with the alumina-silica hydrogel, resulting in a more perfect metal silica-alumina structure.

The incorporation of fluoride into the silica-alumina base is important for it apparently results in a more stable structure than that obtained with, for example, a conventional fluoride-treated impregnated catalyst. Increased activity, if any, resulting from a conventional fluoride treatment of nickel impregnated on preformed silica-alumina is usually lost after only a few hours' use, the activity eventually being about the same or less than an impregnated catalyst which has not been treated. Incorporation of fluoride into the silica-alumina hydrogel is considered to enhance the effectiveness of the hydrogenative component and of the acidic or cracking function. The presence of fluoride in the hydrogel apparently results in a more complete interaction of the metal ion, e.g., nickel ion, with silica-alumina gel, as a consequence of which a highly active and stable nickel-fluoro-silica-alumina structure is obtained upon calcination of the hydrogel. Although a fluoride content of up to about 5% may be incorporated in the ion-exchanged catalyst, there seems to be little if any advantage in going above a fluoride content of about 3% by weight.

Compared with a nickel catalyst prepared by other methods such as impregnation, the high activity of ion-exchanged catalyst permits higher space velocities and/or lower temperatures to be used for a given conversion with a given feed in a hydrocracking process. The use of high space velocities is advantageous in that reactor size and catalyst inventory can be lower, which is important from the cost standpoint, particularly in a high-pressure process.

Moreover, the superior resistance to nitrogen poisoning possessed by the ion-exchanged catalyst is quite advantageous in providing a practical commercial process.

The preparation of ion-exchanged catalysts normally comprises four basic and essential steps: (1) formation of a silica-alumina hydrogel; (2) washing of the hydrogel to remove undesirable cations; (3) ion exchange of metal ions onto the surface of the washed hydrogel, and (4) removal of water from the catalyst. Within the context of this basic procedure, fluorine can be added to the catalyst, usually as a salt such as ammonium fluoride or sodium fluoride, either before the removal of undesirable cations or by ion exchange concurrently with deposition of the metal ions on the hydrogel by ion exchange. In both cases, however, it has been found that the amount of metal which can be incorporated into the hydrogel by ion exchange from a solution of given concentration, is affected by the presence of fluoride ions, especially when the fluorine has been incorporated into the hydrogel prior to addition of the metal.

Applicant has now discovered a process by which the effect of fluoride in reducing the amount of metal which can be ion-exchanged onto the catalyst is effectively overcome. More specifically, applicant has discovered a modification of the basic process for the preparation of ion-exchanged hydrocracking catalyst whereby greater amounts of metal may be ion-exchanged onto acid hydrogels in the presence of fluorine, thereby improving the utilization of metals from a given amount and concentration of ion-exchange solution. Applicant's improved process comprises the steps (1) formation of a silica-alumina hydrogel, (2) washing of the hydrogel to remove undesirable cations, (3) treatment of the washed hydrogel with a dilute aqueous solution of ammonium hydroxide, (4) ion exchange of metal ions onto the surface of the treated hydrogel, and (5) removal of water from the metal-containing hydrogel.

Each of these steps will be better understood from the detailed discussions following.

Formation of hydrogel

As mentioned hereinbefore, it is preferred that the base for the catalysts produced by the process of the invention contain both silica and alumina. The preferred base is predominantly silica and contains from about 50% to about 90% silica with the remainder, i.e., about 50% to 10%, alumina. A particularly preferred silica-alumina catalyst base comprises from about 70% to 90% silica and from about 30% to 10% alumina, and still more preferably from about 30% to 20% alumina.

The preferred method of making the silica-alumina hydrogel is based upon the latter of the two aforementioned techniques, i.e., by addition of an appropriate amount of aluminum sulfate (e.g., alum) to an already formed silica gel. This procedure, wherein the pH of the reaction mixture of silica gel and aluminum sulfate is maintained at a pH of about 6, results in a hydrogel having very good filtration properties. In addition, it has been found by past experience that considerably less washing is required to obtain adequate removal of undesirable cations therefrom.

It should be noted that fluoride can effectively be added to the hydrogel at this step of the process, in which case it is most conveniently added as hydrofluoric acid. Fluorine salts such as sodium fluoride, ammonium fluoride and ammonium bifluoride may be used as well. However, the use of sodium fluoride will, as a practical matter, be avoided since its use introduces additional undesirable cations (sodium) which must later be removed by washing.

Removal of undesirable cations

To remove unwanted cations from the hydrogel, it is necessary to wash and filter the hydrogel one or more times. This is done by filtering and reslurrying the hydrogel with water to which is added an agent which will react with the sodium in the hydrogel to form a water-soluble salt which is then removed by filtering out the wash water in which it is dissolved. A number of such agents are known in the art, e.g., acids, acid salts, and ammonium salts. However, for applicant's process it is preferred to use acidulated water having a pH of from about 2 to about 4, and preferably about 3. Wash solutions suitable for this purpose may be prepared by addition of small amounts of acids, such as sulfuric or hydrochloric, to water, or by decationization of hard water. Normally, the washing step comprises at least 2 and in some cases twelve or more washing and filtration sequences, the number being determined by such things as the degree of mixing, the amount of sodium in the hydrogel and the desired degree of sodium removal.

To improve the efficiency of cation (sodium) removal, it may be preferred to heat the acidified water solution to at least 30° C. and preferably 40° C. However, it is also preferred not to exceed a washing temperature of about 60° C.

Treatment of washed hydrogel with ammonium hydroxide

Upon completion of washing the silica-alumina hydrogel, e.g., with acidulated water, the washed and filtered hydrogel is treated with a dilute aqueous solution of ammonia. More particularly, the hydrogel is treated with dilute ammonium hydroxide so as to render to the mixture of hydrogel and dilute ammonium hydroxide a pH of 7–9, and preferably 7–8. The ammonia treated hydrogel usually is then filtered to remove excess water prior to the ion exchange step.

Ion exchange

The ion exchange step is effected with a suitable solution of the metal compound, which can be any suitable water-soluble compound of the metal in which the metal preferably is present as a cation. If the fluoride has not already been incorporated into the hydrogel in accordance with the method discussed hereinabove under the heading "Formation of Hydrogel," suitable water-soluble compounds of fluorine are likewise incorporated into the ion exchange solution. As mentioned before, it is preferred that the water-soluble fluorine compound be one that contains a volatile cation which can be removed by subsequent heating. Examples of such fluorine compounds are ammonium fluoride, ammonium bifluoride and hydrofluoric acid.

The concentration of water-soluble metal and fluorine compounds (in the instance in which fluorine has not been predeposited in the hydrogel) in the ion exchange solution will depend upon the amount of metal and fluorine which it is desired to place into the catalyst. Typically, however, the amount of metal in the ion exchange solution may be as low as 5–10% in excess of the desired amount to be placed onto the catalyst base. On the other hand, it is found that the uptake of fluorine is less. Therefore, it will be desired to use 10–60% more fluorine compound than is theoretically necessary to attain the desired fluorine deposition.

Following the ion exchange step, the metal- and fluorine-treated hydrogel is subjected to a series of water removal steps, during which the catalyst base is also placed into a convenient size and shape.

Following the ion exchange step, the metal- and fluorine-containing hydrogel is filtered to remove the ion exchange solution and filtered and washed to remove any unreacted metal. The hydrogel is then filtered to remove the wash water. The filtered hydrogel cake, because of the peculiar properties of such hydrogels, contains on the order of 10% solids. Either with or without further adjustment of the water content, the hydrogel can be extruded to the proper size. The extrudate is then dried and calcined to form the finished catalyst.

The catalysts prepared in accordance with the invention typically have the following compositional range:

|  | Percent by weight |
|---|---|
| Nickel | 0.5–12 |
| Fluorine | 0.5–5 |
| Silica/alumina | 63–84 |

The process of catalyst preparation is illustrated more explicitly by reference to the examples which follow:

EXAMPLE I

A catalyst sample was prepared in accordance with the invention by use of the following procedure:

A silica-alumina hydrogel was prepared by adding 376 grams of sodium silicate (27% silica) and 145 cc. of 3 molar sulfuric acid to 2400 cc. of water, to which mixture was added a solution of 209 grams of aluminum sulfate $(Al_2(SO_4)_3 \cdot 18H_2O)$ in 1000 cc. of water. The pH of the resultant silica-alumina hydrogel was then raised to 7 by the addition of ammonium hydroxide. The hydrogel was washed and filtered three times with acidulated water which had been prepared by adding sulfuric acid to the wash water until its pH was 3. The temperature of the acidified water was 40° C. The washed and filtered hydrogel was then rinsed several times with distilled water and filtered. The purpose of the acid water washing was to remove the sodium ions contained in the hydrogel.

The thus-washed hydrogel was mixed (slurried) with two liters of water and enough ammonium hydroxide was added to the mixture to render the slurry to a pH of 7. The slurry was filtered, reslurried and again mixed with water and ammonium hydroxide in accordance with the foregoing procedure. The slurry from the second treatment was filtered.

The filtered ammonia-treated hydrogel was added to an ion exchange solution consisting of 35 grams of nickelous nitrate $(Ni(NO_3)_2 \cdot 6H_2O)$ and 12 grams of ammonium fluoride dissolved in two liters of water, and the mixture was allowed to stand at room temperature for about three hours. The thus ion-exchanged hydrogel was filtered out of the ion exchange solution and washed with water to remove unreacted nickel and fluoride. It was found that 90–95% of the nickel and 65–75% of the fluorine had been removed from the ion exchange solution.

The washed hydrogel was then dried and calcined. The nickel content of the calcined catalyst was 4.5% by weight and the fluorine content 3.5% by weight.

EXAMPLE II

The procedure of Example I was again employed to prepare a nickel-fluoride on silica-alumina catalyst, except that the washed hydrogel was not treated with ammonium hydroxide prior to the ion exchange operation. Analysis of the calcined catalyst revealed that it contained only 3.08% by weight nickel and 3.2% fluorine. It is therefore apparent that the dilute ammonium hydroxide treatment employed in Example I resulted in almost 50% more nickel deposition than the method of Example II in which no ammonium hydroxide was employed to treat the acid water-washed hydrogel prior to the ion exchange step.

EXAMPLE III

A silica-alumina hydrogel was prepared by adding 376 grams of sodium silicate (27% silica) and 145 cc. of 3 molar sulfuric acid to 2400 cc. of water to which mixture was added a solution of 209 grams of aluminum sulfate $(Al_2(SO_4)_3 \cdot 18H_2O)$ and 16 grams of hydrofluoric acid (48%) in 1000 cc. of water. The pH of the resultant silica-alumina hydrogel was then raised to 7 by the addition of ammonium hydroxide (3 molar). The hydrogel was then washed with water and filtered. The water-washed hydrogel was reslurried with two liters of 0.5 molar aqueous ammonium nitrate at a temperature of 40° C., filtered and again washed with water. This washing procedure was repeated a number of times until the sodium content of the hydrogel was below 0.02% by weight. Upon completion of the last ammonium nitrate and water-washing steps, the thus-washed hydrogel was again filtered.

The filtered hydrogel was ammonia-treated by re-slurrying the hydrogel in two liters of dilute ammonium hydroxide, the pH of the slurry being 7. This slurry was filtered and retreated in the same manner. The filtered ammonia-treated hydrogel was then added to an ion exchange solution consisting of 40 grams of nickelous nitrate $(Ni(NO_3)_2 \cdot 6H_2O)$ in 2 liters of water. After immersion in the ion exchange solution for about three hours at about room temperature, the ion-exchanged hydrogel was water washed, dried and calcined. The nickel content of the calcined catalyst was 2.9% by weight.

EXAMPLE IV

The procedure of Example III was again employed to prepare a nickel-fluoro-alumino-silicate catalyst, except that the coated hydrogel was not ammonia-treated prior to the ion exchange step. The resulting catalyst contained only 1.9% by weight nickel.

In the foregoing example the nickel and fluorine were both incorporated into the catalyst base by ion exchange. However, as mentioned hereinbefore, the process of the invention is similarly effective when the fluorine is incorporated into the hydrogel prior to the nickel. This is illustrated by the following two examples.

EXAMPLE V

A silica-alumina hydrogel was prepared by adding 376 grams of sodium silicate (27% silica) and 145 cc. of 3 molar sulfuric acid to 2400 cc. of water to which mixture was added a solution of 209 grams of aluminum sulfate ($Al_2(SO_4)_3 \cdot 18H_2O$) and 16 grams of hydrofluoric acid (48%) in 1000 cc. of water. The pH of the resultant silica-alumina hydrogel was then raised to 7 by the addition of ammonium hydroxide (3 molar). The hydrogel was then washed with water and filtered. The water-washed hydrogel was reslurried with two liters of dilute sulfuric acid (pH 3) at a temperature of 40° C., filtered and again washed with water. This washing procedure was repeated a number of times until the sodium content of the hydrogel was below 0.02% by weight. Upon completion of the last acid and water-washing steps, the thus-washed hydrogel was again filtered.

The filtered hydrogel was ammonia-treated by reslurrying the hydrogel in two liters of dilute ammonium hydroxide, the pH of the slurry being 7. This slurry was filtered and retreated in the same manner. The filtered ammonia-treated hydrogel was then added to an ion exchange solution consisting of 40 grams of nickelous nitrate ($Ni(NO_3)_2 \cdot 6H_2O$) in 2 liters of water. After immersion in the ion exchange solution for about three hours at about room temperature, the ion-exchanged hydrogel was water washed, dried and calcined. The nickel content of the calcined catalyst was 1.24% by weight and the fluorine content 2.0% by weight.

EXAMPLE VI

The procedure of Example V was again employed to prepare a nickel-fluoro-alumino-silicate catalyst, except that the coated hydrogel was not ammonia-treated prior to the ion exchange step. The resulting catalyst contained only 0.49% by weight nickel. The flurorine content was 1.9% by weight.

The data of Examples V and VI show graphically the beneficial effect of ammonia treatment even under circumstances in which the interference of fluorine with nickel uptake is greatest, that is, when fluorine is incorporated into hydrogel prior to ion-exchanging the nickel onto the catalyst base.

While the above examples show the incorporation of only one metal hydrogenation component into a hydrogel, it is to be understood that one or more metals may be incorporated into the hydrogel type catalyst. For example, iron group metals are frequently incorporated with other metals, to provide a catalyst having improved activity, selectivity and stability. When more than one metal is to be used, the second metal may be added to the catalyst at only appropriate stages, such as by ion exchange or impregnation into the hydrogel either together with or separately from the first metal or into the calcined metal-fluoro-alumino-silicate.

EXAMPLE VII

A series of transition metal catalysts was prepared by the process involving the steps (1) preparation of a fluorine-containing silica-alumina hydrogel; (2) washing and filtering the hydrogel with an aqueous solution of ammonium nitrate to remove sodium ions; (3) treatment of the washed hydrogel with dilute ammonium hydroxide (5.2 grams concentrated $NH_4OH$ per 200 grams of catalyst, dry basis), (4) incorporation of metal(s) onto the treated hydrogel by ion exchange from an aqueous solution of a salt of the metal(s) and (5) calcination of the metal-containing hydrogel. The results were as follows:

Table I.—*Preparation of transition metal-fluoro-aluminosilicate catalysts with ammonia treatment*

| Metal(s)[1]: | Metal content, percent by weight; basis dry basis |
|---|---|
| Cu | 7.5 |
| Cu/Ru | 6.9/0.3 |
| Cu/Mo | 4.9/5.6 |
| Cu/Fe | 8/2 |
| Fe | 10 |
| Pd | 0.6 |
| Pd/Ru | 0.63/0.13 |
| W | 6.9 |
| Mo | 4.3 |

[1] All metals incorporated into hydrogel from aqueous solution of nitrate salt except W and Mo, which were prepared from ammonium salts.

EXAMPLE VIII

The following transition metal-containing catalysts are prepared by immersion of an ammonia-treated silica-alumina hydrogel, from which substantially all the sodium ions have been removed, in an aqueous solution of the below-indicated metal salts to incorporate the respective metal ions into the hydrogel, followed by removal of water from the metal-containing hydrogel.

Table II.—*Preparation of transition metal-fluoro-alumino-silicate catalysts with ammonia treatment*

| Metal: | Incorporating salt |
|---|---|
| Zinc | Zinc nitrate |
| Lanthanum | Lanthanum nitrate |
| Rhenium | Ammonium perrhenate |
| Platinum | Tetrammine platinous chloride |
| Vanadium | Ammonium vanadate |

I claim as my invention:

1. In a process for the preparation of a transition metal-fluoro-aluminosilicate catalyst, said metal having an atomic number less than 79, comprising the formation of a silica-alumina hydrogel, washing the hydrogel to remove undesirable cations from the hydrogel, exchanging transition metal ions onto the surface of the hydrogel in the presence of fluoride ions, and removing water from the ion-exchanged hydrogel, the improvement which comprises treating the washed hydrogel, prior to exchange of transition metal ions thereon, with sufficient dilute ammonium hydroxide to provide a pH of 7–9, thereby increasing the amount of transition metal exchanged onto the hydrogel.

2. The improved process according to claim 1 wherein fluoride is incorporated into the hydrogel during formation of the hydrogel.

3. The process according to claim 1 wherein the metal is a Group VIII metal.

4. In a process for the preparation of a transition metal-fluoro-aluminosilicate catalyst, said metal having an atomic number less than 79, comprising the formation of a silica-alumina hydrogel, washing the hydrogel to remove undesirable cations from the hydrogel, exchanging fluoride ions and transition metal ions onto the surface of the hydrogel, and removing water from the ion-exchanged hydrogel, the improvement which comprises treating the washed hydrogel, prior to exchange of transition metal ions thereon, with sufficient dilute ammonium hydroxide to provide a pH of 7–9, thereby increasing the amount of transition metal exchanged onto the hydrogel.

5. The process according to claim 4 wherein the metal is an iron group metal.

6. In a process for the preparation of transition metal-fluoro-aluminosilicate catalyst, said metal having an atomic number less than 79, comprising the formation of a silica-alumina hydrogel, washing the hydrogel with acidulated water to remove undesirable cations from the hydrogel, exchanging transition metal and fluoride ions onto the surface of the hydrogel and removing water from the hydrogel, the improvement which comprises treating the washed hydrogel, prior to exchange of transition metal ions thereon, with sufficient dilute aqueous ammonium hydroxide to provide a pH of 7–9, thereby increasing the amount of transition metal exchanged onto the hydrogel.

7. In a process for the preparation of nickel-fluoro-aluminosilicate catalyst comprising the formation of a silica-alumina hydrogel, washing the hydrogel to remove undesirable cations from the hydrogel, exchanging nickel and fluoride ions onto the surface of the hydrogel, and removing water from the ion-exchanged hydrogel, the improvement which comprises treating the washed hydrogel, prior to exchange of nickel ions thereon, with sufficient dilute aqueous ammonium hydroxide to provide a pH of 7–9, thereby increasing the amount of nickel exchanged onto the hydrogel.

8. In a process for the preparation of a transition metal-fluoro-aluminosilicate catalyst, said metal having an atomic number less than 79, comprising the formation of a silica-alumina hydrogel by adding a mineral acid to sodium silicate to form silica gel at a pH of 8–9, adding an aluminum salt to the silica gel and neutralizing the salt to precipitate alumina, washing the hydrogel to remove undesirable cations, exchanging transition metal ions onto the surface of the hydrogel in the presence of fluoride ions, and removing water from the ion-exchanged hydrogel, the improvement which comprises treating the washed hydrogel, prior to exchange of transition metal ions thereon, with sufficient dilute ammonium hydroxide to provide a pH of 7–9, thereby increasing the amount of transition metal exchanged onto the hydrogel.

9. The process according to claim 8 wherein the transitional metal is an iron group metal.

10. The process according to claim 9 wherein the metal is nickel and is ion exchanged onto the hydrogel from a common solution with fluoride ions.

References Cited
UNITED STATES PATENTS

| | | | |
|---|---|---|---|
| 2,477,695 | 8/1949 | Kimberlin | 252-441 X |
| 2,506,923 | 5/1950 | Hoekstra. | |
| 2,623,860 | 12/1952 | Haensel | 252—441 |
| 2,892,799 | 6/1959 | Brennan et al. | 252—442 |
| 2,917,466 | 12/1959 | Tamele et al. | 252—442 X |
| 3,004,929 | 10/1961 | Lucas et al. | 252—442 |
| 3,124,540 | 3/1964 | Wilson et al. | 252—441 |
| 3,129,189 | 4/1964 | Wilson et al. | 252—441 |

OSCAR R. VERTIZ, *Primary Examiner.*

EDWARD STERN, MILTON WEISSMAN, *Examiners.*